United States Patent Office 3,484,495
Patented Dec. 16, 1969

3,484,495
CATALYTIC PROCESS FOR PREPARING ALKYL CHLORIDES OR BROMIDES
Samuel Corbett Carson and George Oswald Morris, Runcorn England, assignors to Imperial Chemical Industries Limited, London, England, a corporation of Great Britain
No Drawing. Filed Apr. 13, 1967, Ser. No. 630,540
Claims priority, application Great Britain, Apr. 21, 1966, 17,494/66
Int. Cl. C07c *17/16, 17/22*
U.S. Cl. 260—657                                      5 Claims

ABSTRACT OF THE DISCLOSURE

Production of alkyl chlorides or alkyl bromides by interaction of hydrogen chloride or hydrogen bromide with the corresponding alkanol or a dialkylether thereof in the presence of impregnated active charcoal catalysts.

---

This invention relates to an impregnated active charcoal catalyst and the use thereof in a vapour-phase catalytic process for the manufacture of alkyl chlorides and alkyl bromides.

It is known that alkyl chlorides and alkyl bromides may be prepared by the interaction of hydrogen chloride or bromide with the corresponding alkanol (for example methanol) or a dialkyl ether thereof (for example dimethyl ether) in the vapour-phase in the presence of a catalyst. Such known processes are capable of giving a high degree of conversion of the alkanol or dialkyl ether thereof into the alkyl chloride or alkyl bromide over relatively short periods of operation but physical breakdown of the catalyst and/or loss of activity of the catalyst occur over the long periods of operation which are desirable on a commercial scale.

We have now found that improved catalysts may be obtained by impregnating active charcoal with cadmium chloride or cadmium phosphate.

Thus according to the present invention there is provided a process for the manufacture of an alkyl chloride or an alkyl bromide which comprises interacting hydrogen chloride or hydrogen bromide respectively with the corresponding alkanol (or a dialkyl ether thereof) in the vapour-phase at an elevated temperature in the presence of a catalyst obtained by impregnating active charcoal with cadmium chloride or cadmium phosphate.

The proportion of cadmium salt incorporated in the catalyst may vary over a wide range but it is generally preferred to use from 0.05 to 0.25 mole of cadmium chloride or cadmium phosphate per 100 grams of active charcoal.

Impregnation may be carried out by standard techniques, for example by stirring the active charcoal with an aqueous solution of the impregnant material, followed by removal of the excess solution.

The preferred method of preparation of the catalyst comprises impregnation with an aqueous solution of cadmium phosphate.

The resulting catalyst may be used either in a fixed bed or in a fluidised bed.

As in known processes, the proportion of hydrogen chloride or hydrogen bromide and the alkanol (or a dialkyl ether thereof) in the reactant gases may vary widely but it is preferred to maintain a slight molar excess of hydrogen chloride or hydrogen bromide, for example from 1.05 to 1.15 moles of hydrogen chloride or hydrogen bromide per mole of alkanol or from 2.05 to 2.30 moles of hydrogen chloride or hydrogen bromide per mole of a dialkyl ether thereof.

The reaction temperature is preferably maintained in the range 250° C. to 400° C. The range 250° C. to 325° C. is especially preferred and it is an advantage of the catalysts described herein that a high degree of conversion of the alkanol or ether may be obtained under these relatively mild conditions. The optimum reaction temperature and "space velocity" depend upon the particular reactants and catalysts employed; in general, preferred "space velocities" are those in the range from 500 to 3000 hour$^{-1}$ (calculated from the total volume of reactant gases, measured at N.T.P., and the volume of the catalyst bed).

The reaction is conveniently carried out at substantially atmospheric pressure but higher or lower pressures may be used.

The process is applicable in particular to the manufacture of methyl chloride from methanol and hydrogen chloride but is also applicable to the preparation of other alkyl chlorides and of alkyl bromides (for example those containing from 2 to 4 carbon atoms) from the corresponding alkanol or a dialkyl ether thereof.

The invention is illustrated, but not limited, by the following examples.

EXAMPLE 1

Granules (5–8 B.S.S. mesh, having surface area approximately 890 m.$^2$/g.) of an active charcoal (commercially available as "Farnell" charcoal) were impregnated with an aqueous solution of cadmium phosphate to give a catalyst containing 0.20 mole of $Cd_3(PO_4)_2$ per 100 grams of charcoal.

A mixture of methanol vapour and hydrogen chloride was preheated to 200° C. and passed downwards through a 6-inch bed of the catalyst in a 1-inch bore glass tube heated in a furnace maintained at 220° C. The flow-rate of hydrogen chloride was 27 l/hour and the flow-rate of methanol was 25 l/hour, corresponding to a space velocity of 780 hour$^{-1}$.

The temperature of the catalyst bed rose, owing to the heat of reaction; the maximum temperature reached was 275° C. at a short distance from the inlet end of the bed.

After 340 hours the molar conversion of methanol into methyl chloride was 94%. At the end of this period there was no detectable physical breakdown of the catalyst (i.e. the proportion of "fines," passing through an 8 B.S.S. mesh sieve, was negligible).

EXAMPLE 2

The activated charcoal described in Example 1 was impregnated with an aqueous solution of cadmium chloride to give a catalyst containing 0.15 mole of $CdCl_2$ per 100 grams of charcoal.

A mixture of dimethyl ether vapour and hydrogen chloride was passed downwards through the bed (of the same dimensions as described in Example 1) of treated catalyst, the furnace being maintained at 255° C. The flow-rate of hydrogen chloride was 50 l/hour and the flow-rate of dimethyl ether was 24 l/hour, corresponding to a space velocity of 1100 hour$^{-1}$. The maximum temperature reached in the bed was 315° C.

After establishment of steady state conditions, the yield of methyl chloride from dimethyl ether was 92 mole percent.

EXAMPLE 3

The activated charcoal described in Example 1 was impregnated with an aqueous solution of cadmium chloride to give a catalyst containing 0.15 mole of $CdCl_2$ per 100 grams of charcoal.

A mixture of ethanol vapour and hydrogen chloride was preheated to 180° C. and passed downwards through the bed (of the same dimensions as described in Example 1) of treated catalyst, the furnace being maintained at 240° C. The flow-rate of hydrogen chloride was 55 1/hour and the flow-rate of ethanol was 45 1/hour, corresponding to a space velocity of 1500 hour$^{-1}$. The maximum temperature reached in the bed was 300° C.

After establishment of steady state conditions, the yield of ethyl chloride from ethanol was 96 mole percent.

EXAMPLE 4

The activated charcoal described in Example 1 was impregnated with an aqueous solution of cadmium chloride to give a catalyst containing 0.15 mole of $CdCl_2$ per 100 grams of charcoal.

A mixture of methanol vapour and hydrogen bromide was preheated to 180° C. and passed downwards through the bed (of the same dimensions as described in Example 1) of treated catalyst, the furnace being maintained at 255° C. The flow-rate of hydrogen bromide was 47 1/hour and the flow-rate of methanol was 45 1/hour, corresponding to a space velocity of 1400 hour$^{-1}$. The maximum temperature reached in the bed was 300° C.

After establishment of steady state conditions, the yield of methyl bromide from methanol was 100 mole percent.

What we claim is:

1. A process for the manufacture of a member of the group consisting of methyl chloride, ethyl chloride and the corresponding bromides which comprises interacting hydrogen chloride or hydrogen bromide respectively with the corresponding alkanol or dialkyl ether thereof in the vapour-phase at 250° C. to 400° C. in the presence of a catalyst consisting essentially of the product obtained by impregnating active charcoal with cadmium phosphate, the catalyst containing 0.05 to 0.25 mole of cadmium phosphate per 100 grams of active charcoal.

2. A process as claimed in claim 1 wherein the catalyst is a catalyst obtained by impregnation of active charcoal with an aqueous solution of cadmium phosphate.

3. A process as claimed in claim 1 wherein hydrogen chloride or hydrogen bromide is interacted with methanol the proportion of hydrogen chloride or hydrogen bromide being from 1.05 to 1.15 moles per mole of methanol.

4. A process as claimed in claim 1 wherein hydrogen chloride or hydrogen bromide is interacted with dimethyl ether, the proportion of hydrogen chloride or hydrogen bromide being from 2.05 to 2.30 moles per mole of dimethyl ether.

5. A process as claimed in claim 1 wherein the temperature is in the range from 250° C. to 325° C.

References Cited

UNITED STATES PATENTS

| | | | |
|---|---|---|---|
| 1,738,193 | 12/1929 | McKee et al. | 260—657 |
| 1,834,089 | 12/1931 | Carlisle | 200—657 |
| 1,852,063 | 4/1932 | Ricard | 260—657 |
| 1,920,246 | 8/1933 | Daudt | 260—657 |
| 1,920,846 | 8/1933 | Daudt | 260—657 |

DANIEL D. HOROWITZ, Primary Examiner

U.S. Cl. X.R.

252—437